Nov. 2, 1926.   1,605,825

F. FEKETE

CROSS WORD PUZZLE DEVICE

Filed August 27, 1925

WITNESSES
Edw. Thorpe
J. L. McAuliffe

INVENTOR
Frank Fekete
BY
ATTORNEYS

Patented Nov. 2, 1926.

1,605,825

UNITED STATES PATENT OFFICE.

FRANK FEKETE, OF FLUSHING, NEW YORK.

CROSS-WORD-PUZZLE DEVICE.

Application filed August 27, 1925. Serial No. 52,909.

My invention has for its general object to provide a cross-word puzzle sheet bearing indicia and co-ordinated lettered blocks having on the faces thereof indicia corresponding with the indicia on the board and of a character to indicate to a child the letter to be placed in a given square of the board in the formation of the words in a cross-word puzzle, and thereby possess educational value.

Reference is to be had to the accompanying drawings forming a part of this specification, it being understood that the drawings are merely illustrative of practical examples of the invention.

Figure 1:
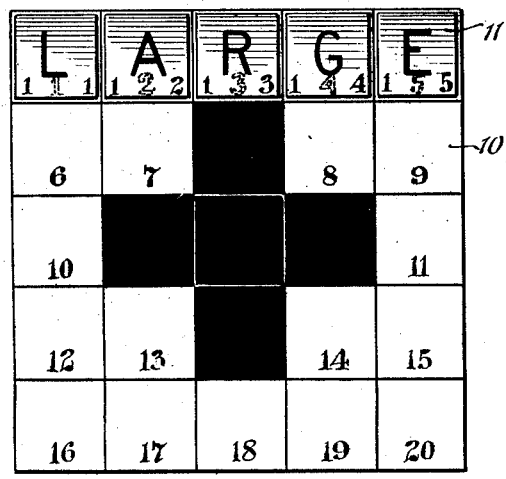
Figure 1 is a plan view of a sheet formed to function in carrying out my invention.
Figure 4:
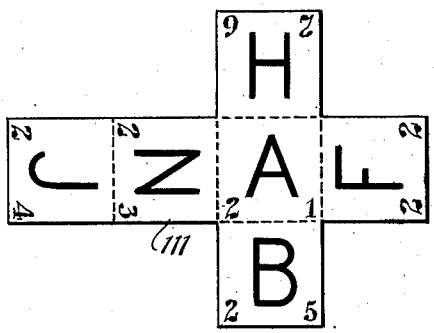
Figure 4 is a view similar to Figure 3 but showing a developed view of the faces of another block bearing different characters from the one in Figure 3.
Figure 2:
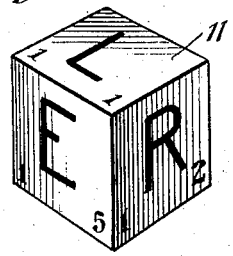
Figure 2 is a perspective view of a block bearing matter coordinated with the matter on the sheet shown in Figure 1, which block may be employed in the formation of a word in a cross-word puzzle.
Figure 3:
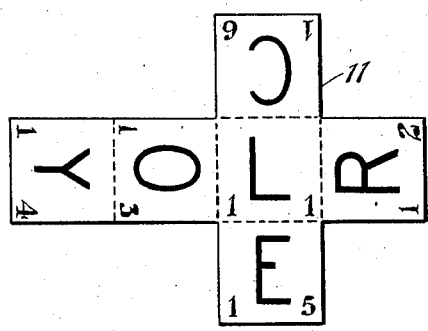
Figure 3 is a developed view of the block faces.

Referring at first to Figures 1 to 4, a sheet 10 is provided in carrying out my invention, and divided into squares which in the preferred and in the complete form of my invention are numbered, there being twenty numbered squares on the sheet shown and in addition five squares at the center arranged in cruciform shape. Said squares in addition as identified by numbers, are adapted to receive novel blocks one of which is shown in Figure 2 with the developed view thereof in Figure 3, and a view of the second block is shown in Figure 4 for playing a second game. There are a series of blocks 11 bearing a number, 1, 2, or 3 or other corresponding symbol identifying the words of a particular puzzle. I have shown blocks positioned in Figure 1 forming the word "large". It will be observed that each of these blocks bears the numeral 1 in a corner of each face of the block. This identifies the number of the puzzle and a series of blocks in sufficient number will bear that identifying number of the puzzle to form that particular puzzle. In addition, each block 11 in a series, pertaining to a given puzzle, bears a number corresponding with a number on a square in the sheet 10. Thus, it will be seen that the blocks forming the word "large" in Figure 1 bear the numerals 1, 2, 3, 4 and 5, and that said blocks are positioned in those squares of sheet 10 bearing the numerals 1 to 5. It is to be understood that others of the blocks of the series will bear the numerals 7 to 12, etc. there being six faces on each block.

Figure 5:
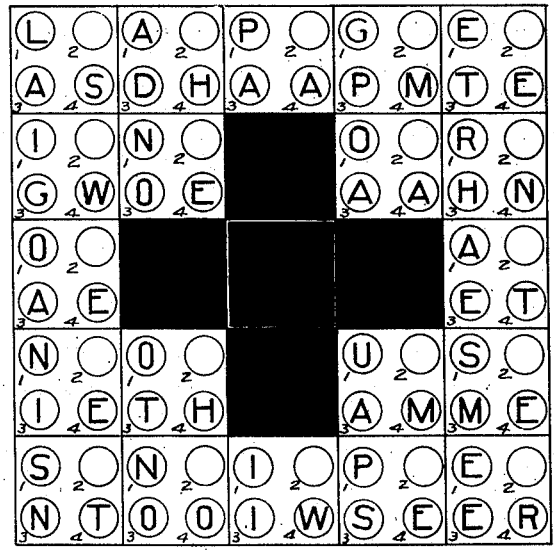
Figure 5 is a fragmentary plan view of a sheet and showing a modification of the arrangement illustrated in Figure 1.

In Figure 4 I have shown a developed view of a block 111 for a second puzzle numbered 2. On each face of the block 111 said block as shown in Figure 4 bears consecutive numbers 1 to 6 to correspond with squares on the sheet 10. In Figure 5, the squares are of a size to present a series of delineated spaces for a plurality of letters each relating to a different puzzle word, there being four spaces 12 shown in the illustrated example. These are numbered according to the puzzle words, that is, puzzles 1, 2, 3 and 4. These spaces may bear letters as indicated in Figure 5 so that a child may take, for example, a block bearing the letter L on a face thereof, as well as the number 1 to identify the particular puzzle word and will place the block on the space numbered 1 and with the letter L on the face uppermost. On the second square from the left in the top row, Figure 5, it will be seen there is another space numbered 1 and bearing the letter A so that a child will take the letter A on a block and numbered 1 and place it on said space bearing the letter A on the sheet 210 in the formation of the word "large", for example. A complete cross-word puzzle is shown in Figure 5.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A device for use in solving cross-word puzzles, comprising a sheet sub-divided into separate areas and said areas bearing different identifying symbols, and a series of blocks bearing characters on the faces thereof and bearing also on said faces symbols corresponding with certain of the symbols on said sheet, as well as a symbol common to all of said blocks to correspondingly identify all of the blocks of the series to thus identify blocks pertaining to a given puzzle word.

2. A device for use in solving cross-word puzzles, including a sheet sub-divided into separate areas and bearing numbers to identify the individual areas; together with a series of blocks bearing numbers corresponding with certain symbols on the said sheet.

3. A device for use in solving cross-word puzzles, including a sheet divided into separate spaces, said spaces sub-divided into smaller spaces and bearing identifying numbers for the respective last-mentioned spaces.

FRANK FEKETE.